United States Patent
Manikfan et al.

(10) Patent No.: US 11,843,266 B2
(45) Date of Patent: Dec. 12, 2023

(54) DYNAMIC NON-LINEAR OPTIMIZATION OF A BATTERY ENERGY STORAGE SYSTEM

(71) Applicant: Honeywell International Inc., Morris Plains, NJ (US)

(72) Inventors: Sameer D. Manikfan, Telangana (IN); Ramakrishnan Ganapathi, Bangalore (IN)

(73) Assignee: Honeywell International, Inc., Charlotte, NC (US)

(*) Notice: Subject to any disclaimer, the term of this patent is extended or adjusted under 35 U.S.C. 154(b) by 306 days.

(21) Appl. No.: 17/165,062

(22) Filed: Feb. 2, 2021

(65) Prior Publication Data

US 2022/0247188 A1 Aug. 4, 2022

(51) Int. Cl.
| | |
|---|---|
| *G06N 3/044* | (2023.01) |
| *H02J 7/00* | (2006.01) |
| *G05B 13/02* | (2006.01) |
| *G06Q 30/018* | (2023.01) |
| *G06F 17/14* | (2006.01) |
| *G05B 13/04* | (2006.01) |

(52) U.S. Cl.
CPC ........ *H02J 7/00032* (2020.01); *G05B 13/027* (2013.01); *G05B 13/042* (2013.01); *G06F 17/142* (2013.01); *G06N 3/044* (2023.01); *G06Q 30/018* (2013.01); *H02J 7/0068* (2013.01)

(58) Field of Classification Search
CPC .... H02J 7/00032; H02J 7/0068; G06N 3/044; G05B 13/027; G05B 13/042; G06F 17/142; G06Q 30/018
See application file for complete search history.

(56) References Cited

U.S. PATENT DOCUMENTS

| | | | |
|---|---|---|---|
| 6,799,080 | B1 | 9/2004 | Hylden et al. |
| 10,686,327 | B2 | 6/2020 | Manikfan |
| 2008/0109098 | A1 | 5/2008 | Moshier et al. |
| 2010/0017045 | A1 | 1/2010 | Nesler et al. |
| 2016/0103431 | A1 | 4/2016 | Ganapathi et al. |
| 2018/0136285 | A1* | 5/2018 | You ...................... G01R 31/392 |

(Continued)

FOREIGN PATENT DOCUMENTS

| | | |
|---|---|---|
| JP | 2021505103 A | 2/2021 |
| WO | 2016138067 A1 | 9/2016 |

OTHER PUBLICATIONS

"Echo state network", Wikipedia, Retrieved from "https://en.wikipedia.org/w/index.php?title=Echo_state_network&oldid=993895755", page was last edited Dec. 13, 2020, at 01:57 (UTC).

(Continued)

*Primary Examiner* — Gary Collins
(74) *Attorney, Agent, or Firm* — Ortiz & Lopez, PLLC; Kermit D. Lopez; Luis M. Ortiz (57) ABSTRACT

A system and method for optimizing a battery energy storage system (BESS), can involve: inputting data to an echo state network, the data relating to an operation of a battery energy storage system and including one or more of load data, renewable energy data, non-renewable energy data, carbon emissions, carbon credits and a weighted cost of energy; and optimizing the operation of the battery energy storage system based on the data input to and processed by the echo state network and which relates to the operation of the battery energy storage system.

20 Claims, 5 Drawing Sheets

Distributed Generation in Microgrids behind Distribution Transformers

(56) References Cited

U.S. PATENT DOCUMENTS

| | | | |
|---|---|---|---|
| 2020/0076196 A1* | 3/2020 | Lee | H02J 3/008 |
| 2020/0084194 A1 | 3/2020 | McMurdie et al. | |
| 2020/0127474 A1 | 4/2020 | Crawford et al. | |
| 2020/0195011 A1 | 6/2020 | de Callafon et al. | |
| 2020/0227921 A1 | 7/2020 | Guelbenzu et al. | |

OTHER PUBLICATIONS

Herbert Jaeger, "Echo State Network", http://www.scholarpedia.org/article/Echo_state_network, page accessed Dec. 12, 2020.

Experion for Electrical SCADA, Integrated Electrical Network (IEC 61850 Edition 2), 2015 Honeywell International Inc.

Herbert Jaeger and Harald Haas, "Harnessing Nonlinearity: Predicting Chaotic Systems and Saving Energy in Wireless Communication", Apr. 2, 2004 vol. 304, SCIENCE, p. 78-80.

Thomas Bowen, Ilya Chernyakhovskiy, Paul Denholm, "Grid-Scale Battery Storage", National Renewable Energy Laboratory, Sep. 2019.

"SCADA", Wikipedia, Retrieved from https://en.wikipedia.org/w/index.php?title=SCADA&oldid=990252629, page was last edited on Nov. 23, 2020, at 17:37 (UTC).

Carlo Taborelli, Simona Onori, Sebastien Maes, Peter Sveum, Said Al-Hallaj, and Naz Al-Khayat, "Advanced battery management system design for SOC/SOH estimation for e-bikes applications", Int. J. Powertrains, vol. X, No. Y, xxxx.

Shi Guang et al; Optimal Management of Office Energy Consumption via Q-Learning Algorithm, 2017 American Control Conference, Sheraton Seattle Hotel, May 24-26, 2017, Seattle, USA.

Rosato et al; A Smart Grid in Ponza Island: Battery Energy Storage Management by Echo State Neural Network, 2018 IEEE International Conference on Environment and Electrical Engineering and 2018 IEEE Industrial and Commercial Power Systems Europe (EEEIC I&CPS Europe), IEEE, Jun. 12, 2018.

European search Report for European Patent Application No. 22151313.8, dated Oct. 12, 2022.

First Examination Report for Indian Application No. 202214001056, dated Nov. 3, 2022.

Examination report No. 1 for standard patent application, Australian Patent Application No. 2022200073; dated Dec. 1, 2022.

\* cited by examiner

DYNAMIC NON-LINEAR OPTIMIZATION OF A BATTERY ENERGY STORAGE SYSTEM

TECHNICAL FIELD

Embodiments are related to the field of energy storage systems including battery energy storage systems. Embodiments also relate to methods and systems for optimizing a battery energy storage system (BESS). Embodiments further relate to methods and systems for the dynamic non-linear optimization of the operation of a BESS, which takes into account carbon emissions, credits and weighted cost of energy.

BACKGROUND

Deployment of renewable and distributed generation assets for electricity can facilitate minimization of carbon emissions associated with fossil fuel based electric power generation plants. Due to the intermittent and variable nature of renewable generation, it has not been possible to completely eliminate fossil fuel based generators. Carbon emissions reductions, however, may at times be in direct conflict with a requirement to maximize the availability of power, if these are treated as two different objectives that need to be optimized, as in a multi objective optimization system. This is a fundamental problem with optimization algorithms that attempts to maximize the availability of energy and minimize carbon emissions.

Attempts have been made to optimize carbon emission reduction as a separate optimization objective from economic optimization goals. Treating carbon reduction as a separate optimization objective, however, is a problem that has not been adequately addressed because it is not evident who bears the cost of this optimization objective. This objective can run in the counter direction as an economic optimization objective, which may result in economic losses to the entity bearing the cost of the objective, which in some cases may be the producer, who may not have an opportunity to recover this cost from consumers.

Carbon credits have been devised as a market-oriented mechanism for reducing greenhouse gas emissions, which allows the cost of carbon footprint reduction to be quantified and traded as a commodity with an associated currency value. Carbon footprint represents the estimated emission of carbon dioxide ($CO_2$) and other greenhouse gases (GHGs) associated with power generation. Generating power with renewable means allows the generators to earn carbon credits after discounting for the carbon footprints of, for example, solar photovoltaic panels and lithium ion batteries, which may have a small carbon footprint incurred during their manufacturing process.

A carbon footprint may be expressed as, for example, tons of carbon dioxide, or tons of carbon, emitted per year. Currently, there are many versions of carbon calculators available for carbon footprint calculation. Some examples of third-party providers that specialize in calculating carbon footprints include Environmental Resources Trust, Inc., Blue Source, LLC, and various others. On the other hand, a carbon credit (e.g., measured in units of tons of $CO_2$) may represent the act of reducing or avoiding GHG emissions in one place, in order to offset GHG emissions occurring somewhere else.

Battery energy storage systems are becoming cheaper with the cost reduction in lithium as well with the promise of emerging alternates in Na and Fe. Energy forms either as a micro grid or as a grid connected are rapidly emerging and include the use of battery storage systems and devices and renewable sources. The cost and the availability of the energy at any point of operation can be highly dynamic owing to the intermittent nature of the renewable sources, the variation in the load and the dynamic tariff structure of energy with the TOD (Time Of the Day) variations, as well as demand charges that can be applied during dynamic (e.g., time varying) peaks of energy demand. Furthermore, shifts in policy across the world that encourage and facilitate the increased use of renewable will bring battery storage to the center stage of energy supply.

Conventional battery systems operate with the principle of "make hay while the sun shines". That is, batteries can be charged when, for example, solar energy or wind energy is charged to its capacity and discharged when the solar or wind energy is not available. This simple switching may not be optimal as the energy at any point in time may be subject to a strange supply-demand equation.

Solutions have been proposed, which may maximize the energy availed from the sources as per their availability. Unfortunately, the cost of energy varies very widely at various point of time and mere maximizing availability does may result in the optimal cost of the energy. In other words, the maximum energy may not indicate the minimum energy bill at many instances for a consumer. Equally, maximum energy may not indicate the maximum revenue for an energy service provider.

The carbon credits earned from the sale of green power can be considered as a revenue and carbon emissions generated due to the operation of a diesel generator can be considered as a cost in the economic optimization objective instead of treating carbon reduction as a separate optimization objective or as a multi variable optimization objective. An Energy Management System (EMS) may have counters for carbon credits that can be accumulated over a given period of time.

An EMS may also have counters for carbon emissions that can be accumulated over the same period of time. The net carbon credits can be calculated after taking the difference between carbon credits earned and carbon emissions incurred from the microgrid over a time window over which the counters run. An EMS can connect to an external carbon-trading platform and can exchange net carbon credits accumulated for a currency value that may be determined based on carbon pricing signals from the carbon-trading platform.

Battery energy storage systems can enable value stacking or revenue stacking when they are used for multiple use cases. Every use case has a certain revenue and carbon credits potential. Also every use case has a certain cost associated that may include the cost of carbon emissions. An optimal solution is needed, which may maximize the revenue that includes carbon credits and can minimize the cost that includes the emissions cost for consumers.

BRIEF SUMMARY

The following summary is provided to facilitate an understanding of some of the features of the embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved energy storage system.

It is another aspect of the embodiments to provide for an improved battery energy storage system (BESS).

It is also an aspect of the embodiments to provide for methods and systems for optimizing a BESS.

It is yet another aspect of the embodiments to provide for methods and systems for the dynamic non-linear optimization of the operation of a BESS, while taking into account carbon emissions, credits and weighted cost of energy.

The aforementioned aspects and other objectives can now be achieved as described herein. In an embodiment, a method for optimizing a battery energy storage system, can involve: inputting data to an echo state network, the data relating to an operation of a battery energy storage system and including at least: load data, renewable energy data, non-renewable energy data, carbon emissions, carbon credits and a weighted cost of energy; and optimizing the operation of the battery energy storage system based on the data input to and processed by the echo state network and which relates to the operation of the battery energy storage system.

In an embodiment of the method, the echo state network can comprise a neural network.

An embodiment of the method can further involve controlling the battery energy storage system after optimizing the operation of the battery energy storage system based on the data input to and processed by the echo state network.

In an embodiment of the method, optimizing the operation of the battery energy storage system based on the data input to and processed by the echo state network, can further involve: generating a day-ahead schedule for the operation of the battery energy storage system based on data output from an optimization outcome analyzer that can enable a day-ahead schedule selector to select the best or optimal day-ahead schedule from among the day-ahead schedules generated by a mixed integer non-linear solver and the day-ahead schedule output from the echo state network that integrates forecasting and optimization functions. That is, the mixed integer non-linear solver can also generate the day-ahead schedule.

In an embodiment of the method, prior to inputting the data to the echo state network, at least a portion of the data can be subject to a fast fourier transform.

In an embodiment of the method an output of the fast fourier transform can be input to the echo state network.

In an embodiment of the method optimizing the operation of the battery energy storage system based on the data input to and processed by the echo state network can further involve dynamic non-linear optimization of the operation of the battery energy storage system.

In an embodiment, a system can be implemented, which can include: an echo state network, wherein data is input to the echo state network, the data relating to an operation of a battery energy storage system and including at least: load data, renewable energy data, non-renewable energy data, carbon emissions, carbon credits and a weighted cost of energy; and a battery energy storage system, wherein the operation of the batter energy storage system can be optimized based on the data input to and processed by the echo state network and which can relate to the operation of the battery energy storage system.

In an embodiment of the system, the echo state network can comprise a neural network.

An embodiment of the system can further include a controller for controlling the battery energy storage system after optimizing the operation of the battery energy storage system based on the data input to and processed by the echo state network.

An embodiment of the system can further include a day-ahead schedule generated for the operation of the battery energy storage system based on data output from an optimization outcome analyzer that can enable the day-ahead schedule selector to select from among the best or optimal day-ahead schedules generated by the mixed integer non-linear solver and the day-ahead schedule output from the echo state network that integrates forecasting and optimization functions. As indicated previously, the mixed integer non-linear solver can also generate the day-ahead schedule.

In an embodiment of the system, prior to inputting the data to the echo state network, at least a portion of the data can be subject to a fast fourier transform and an output of the fast fourier transform can be input to the echo state network.

In an embodiment of the system optimizing the operation of the battery energy storage system based on the data input to and processed by the echo state network can further involve dynamic non-linear optimization of the operation of the battery energy storage system.

In another embodiment, a system for the dynamic non-linear optimization of an operation of a BESS, can comprise: a mixed integer non-linear solver that can generate a day-ahead schedule; a day-ahead schedule generator based on an echo state network model that integrates functions of forecasting and optimization to minimize effects of uncertainty or errors that can affect an optimization outcome of the mixed integer non-linear solver; an optimization outcome analyzer that can compare the outcomes of two different solvers, wherein at least one of the two different solvers can includes the mixed integer non-linear solver; and a training dataset generator that can generate data for dynamically retraining the echo state network model when an optimization outcome is less optimal than that of the mixed integer non-linear solver.

An embodiment of the system for the dynamic non-linear optimization of an operation of a BESS, can further include a day-ahead schedule selector that can select a best output from the two different solvers.

An embodiment of the system for the dynamic non-linear optimization of an operation of a BESS, can further include a time series forecast generator that can use non-linear regression analysis with respect to input data.

In an embodiment of the system for the dynamic non-linear optimization of an operation of a BESS at least a portion of the input data can be subject to a fast fourier transform and an output of the fast fourier transform can be input to the echo state network model.

An embodiment of the system for the dynamic non-linear optimization of an operation of a BESS, can further include a history module that can store past input data.

In an embodiment of the system for the dynamic non-linear optimization of an operation of a BESS, the echo state neural network model can further comprise a recurrent neural network.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
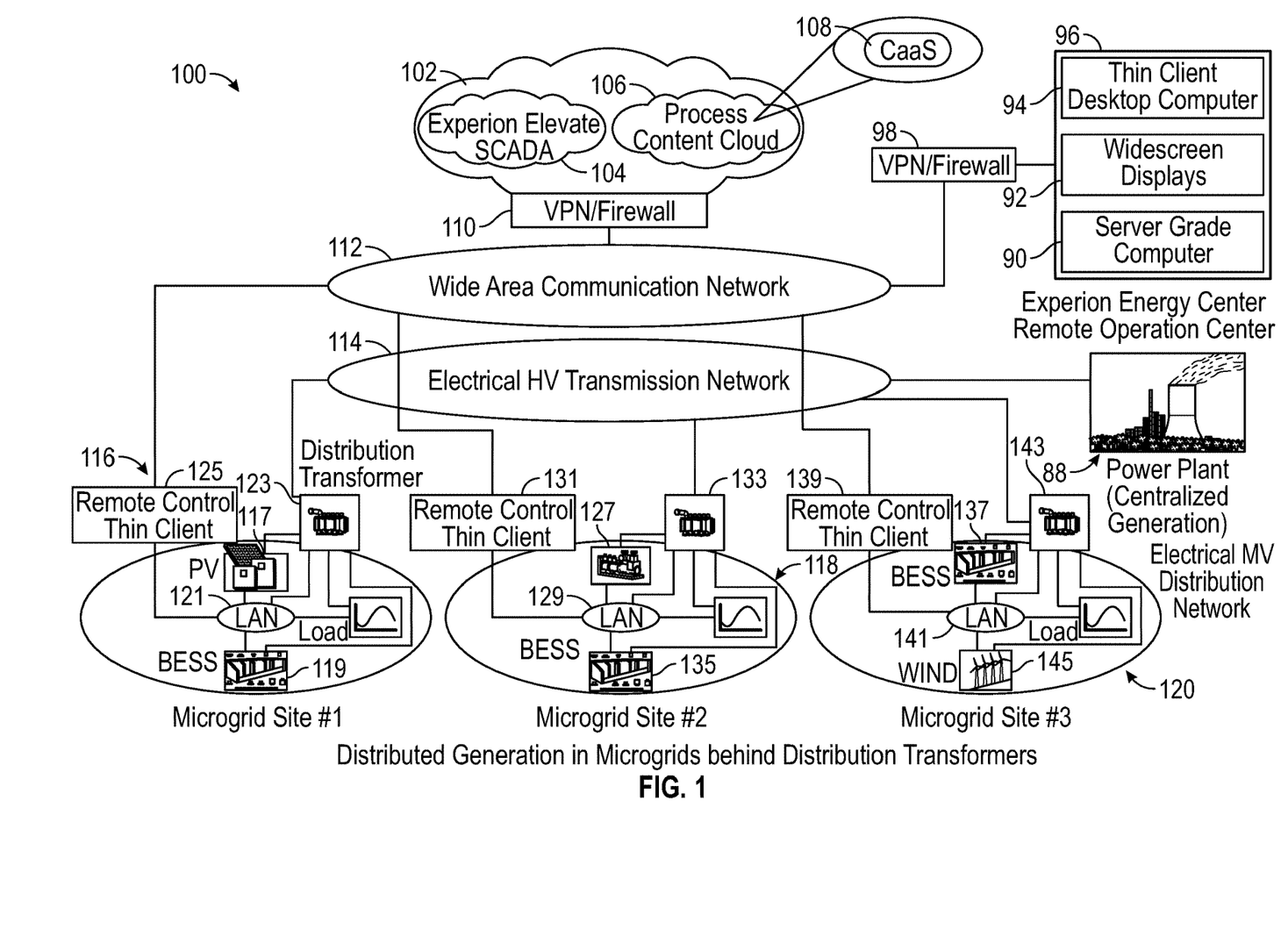
FIG. 1 illustrates a block diagram of an energy system, which can be implemented in accordance with one or more embodiments.

FIG. 1 illustrates a block diagram of an energy system 100, which can be implemented in accordance with one or more embodiments. The energy system 100 depicted in FIG. 1 can include a power plant 88 (i.e., centralized generation) that can be operably connected to an electrical high voltage (HV) transmission network 114. The energy system 100 can also communicate with a wide area communication network 112. The electrical HV transmission network 114 and the wide area communication network 112 can be implemented as two separate networks, to which the energy system 100 can operably connect. The electrical HV transmission network 114 can also communicate with one or more microgrid sites including not limited to a first microgrid site 116, a second microgrid site 118, and a third microgrid site 120.

Note that the term 'microgrid site' can be utilized interchangeably herein with the term 'microgrid' to refer to the same feature. The term 'microgrid' can relate to a localized grouping of electricity generation, energy storage, and loads that can be operably connected to a traditional centralized grid (e.g., power distribution grid or macrogrid) via a point of common coupling. A microgrid may be controlled by a controller, which may be centralized or distributed (e.g., controls distributed energy resources in accordance with voltage or current control schemes).

The first microgrid site 116 may include photovoltaics (PV) 117, which can communicate with a local area network (LAN), and a distribution transformer 123 that can operably connect to the electrical HV transmission network 114. The first microgrid site 116 can further include a BESS (Battery Energy Storage System) 119 that can communicate with the distribution transformer 123, and a remote control thin client 125 that can also operably connect to the distribution transformer 123 and the LAN 119. Load "LOAD" data can also be accessed through the LAN as shown in the diagram of the first microgrid site 116.

Battery storage is a technology that can enable power system operators and utilities to store energy for later use. A BESS is an electrochemical device that can charge (or collect energy) from a grid, a microgrid, or a power plant and then discharge that energy at a later time to provide electricity or other grid services when needed.

The second microgrid site 118 can include a remote control thin client 131, which can communicate with a LAN 129 that in turn can communicate with a BESS 135 and a diesel generator 127. The second microgrid site 118 can also include a distribution transformer 133 that can communicate with the remote control thin client 131.

The third microgrid site 120 can include a remote control thin client 139, a LAN 141, a distribution transformer 143, and a BESS 137. Furthermore, the third microgrid site 120 can include one or more wind turbines 145 (e.g., a wind energy converter) that can convert the wind's kinetic energy into electrical energy. The turbines 145 can communicate with the distribution transformer 143. Load data can be accessed through the LAN 141. Distributed generation can occur through the first microgrid site 116, the second microgrid site 118, and the third microgrid site 120, which may be considered to "behind" the respective distribution transformer 123, the distribution transformer 133, and the distribution transformer 143.

The wide area communication network 112 can also communicate with the remote control thin client 125, the remote control thin client 131, and the remote control thin client 139, and with a VPN/Firewall 110 associated with a network 102 that can include a supervisory control and data acquisition (SCADA) module 104 (e.g., over the cloud (Experion Elevate SCADA)), and Process Control over the Cloud (PCOC) 106. The PCOC 106 can also provide a Control as a Service (CaaS) application 108. Note that the term SCADA refers to 'supervisor control and data acquisition' and relates to a control system architecture comprising computers, networked data communications, and graphical user interface (GUI) for high-level process supervisory management, while also comprising other peripheral devices such as a programmable logical controller (PLC) and discrete proportional-integral-derivative (PID) controllers that can interface with process plant or machinery. SCADA modules and systems can also be used for management and operations of project-driven-processes. Note that as utilized herein, the term 'supervisory controller' may also refer to a SCADA module such as the SCADA module 104.

The wide area communication network 112 can further communicate with a VPN/Firewall 98 that in turn communicates with an energy center remote operations center 96 that can include a thin client desktop computer 94, a widescreen display(s) 92, and a server grade computer 90.

The term 'value stacking' in an energy system such as the energy system 100 that includes a BESS (e.g., such as BESS 119, BESS 135, and BESS 137 depicted in FIG. 1) can involve leveraging the battery to support multiple use cases. Examples of use cases can include peak shaving, peak shifting, power backup, and frequency, active and reactive power support, black start, etc. Each use case can include a revenue opportunity and an associated cost. Value stack optimization has an objective to maximize the value of distributed generation assets coupled with the energy storage system by maximizing the revenue and/or minimizing the cost associated with each use case.

Conventional approaches have treated this problem as a multi-objective optimization problem with multiple objectives or use cases, attempting to maximize the availability. Value stack optimization described with respect to the embodiments can take into consideration revenue associated with each use case, which can include revenue from the sale of energy and carbon credits earned by a distributed generation asset and costs associated with energy purchased from the grid, energy generated by burning diesel or other fuels, operating costs that may include maintenance cost of generation assets, and the costs associated with battery cycle count, the costs of carbon emissions that include a carbon footprint of renewable generation assets.

Certain non-renewable sources of energy such as coal have a lower cost than other non-renewable fuels such as diesel, but may have a higher carbon cost associated with it. When carbon footprint and the cost of carbon dioxide equivalent GHG emissions are taken into account, the true cost of such non-renewable fuels would be accounted. Prior approaches consider carbon footprint reduction as a separate optimization objective. The problem with treating carbon footprint reduction as a separate optimization objective is that it may directly conflict with the energy availability requirements. Treating energy availability as a constraint, rather than an optimization objective can result in achieving lowest cost and maximum revenue from each use case.

This embodiments can optimize rather than minimize the expectation of the weighted cost of energy that may includes the expectation of the energy bill of a consumer (e.g., purchased from a utility), operating costs associated with distributed energy generation, cost of the charging cycles of batteries, carbon credits associated with renewable energy generation and carbon costs associated with fossil fuel based power plants. In such calculation of an energy bill, all the operational costs and carbon costs and credits are included apart from the basic price of electricity from grid and fuel costs. Such an all-inclusive calculation can project a comprehensive picture and ultimate optimization factors.

The problem of optimization of charging and discharge cycles of an energy storage system is different from a combinatorial optimization problem that solves the problem of committing power generation units to loads at any given time, due to the time coupling effect that energy storage has on the entire energy system. The present state of the system, which includes the state of charge of the batteries, current supply and demand, and hence the price of electricity are a function of past decisions, and current decisions affect future state and even future decisions. It is practically not possible to back in time and optimize the past. Hence, an optimization problem may need to consider the expectation of energy costs, demand, generation and price of electricity. Alternate methods to deal with time coupling effects in optimization such as dynamic programming suffers from "curse of dimensionality", a term used by mathematician R. Bellman in his book on Dynamic Programming.

This concept can be illustrated below in the following case. Consider a micro grid which includes the following:
  a battery storage system of capacity 235 KWh and 125 KW
  a solar plant of 125 KW
  a base load of 680 KW
  Fixed load of 175 KW
  Interruptible load of 505 KW
  a variable or peak load of 0 to 217.5 Kw
  a diesel generator set of 175 KW
  a wind energy plant of 120 Kw.

The solar plant can charge the battery, which in turn can relieve the peak demand cutting in during the peak time between 1800 hrs and 2000 hrs. In the example energy system 100 shown in FIG. 1, a solar plant can be represented by the photovoltaics 117. Consider a span of four days with a peak demand of 217.5, 195, 127.5, and 127.5 Kwh. Short term load prediction can enable the knowledge of this profile priori.

The BESS operation represented by BESS 119, BESS 135, and BESS 137 in FIG. 1 can be carried out by subjecting the battery to charging from photovoltaics 117 in the morning and discharging them in the peak. Every cycle of charging/discharging will cost Rs.1470, which can be derived from the cost of the battery Rs. 2058600 and the lifecycle of the battery 1400. This cycle cost can also be included in the energy bill. There are other operational costs, which may not be projected for the sake of simplicity.

An upper bound and a lower bound for Battery State of Charge can be specified to avoid three conditions that can degrade the Battery and reduce its life. These three conditions are as follows:
  1. Over Charging
  2. Deep Discharge
  3. Idling Battery at low State of Charge The upper bound is 95% of battery capacity, e.g., 223.25 KWh. The lower bound is 20% of battery capacity, e.g., 47 KWh. During the half hour that has the highest energy consumption, the utility may resort to load shedding, to cut off the load to the entire microgrid. During this half hour duration, the interruptible loads may be turned off. The remaining fixed loads and variable peak loads may be supported using generation within the microgrid using a BESS or diesel generation.

Three different methods of charging and discharging batteries can be considered, each having a different associated cost, which can demonstrate that the total weighted cost of energy can include carbon costs and credits.

Method 1:

A diesel generator can be committed during the half hour of utility load shedding or Demand Response to curtail load. The BESS can be committed during peak hours to support variable peak load, except the half hour during which utility load shedding may occur. The operation of an example microgrid Operation of microgrid is illustrated in Table 1 below.

TABLE 1

235 KWh BESS supporting variable peak load; DG supporting power backup

| Day | Fixed Load | Interruptible Load | Var Peak Load | Total Load Var Peak + Base | BESS max O/P Power | DG Max O/P Power | Cycle Count | Cycle Cost | Total Weighted Cost | Currency |
|---|---|---|---|---|---|---|---|---|---|---|
| 1 | 175 | 505 | 90 | 770 | 90 | 175 | 1 | 1470 | 133740.4596 | INR |
| 2 | 175 | 505 | 90 | 770 | 90 | 175 | 1 | 1470 | 133675.0221 | INR |
| 3 | 75 | 605 | 60 | 740 | 60 | 75 | 1 | 1470 | 132818.8419 | INR |
| 4 | 75 | 605 | 60 | 740 | 60 | 75 | 1 | 1470 | 133158.4325 | INR |
|   |   |   |   |   |   |   |   | 5880 | 533392.7562 | INR |

Method 2:

In this method, the battery may be committed to support critical loads during the utility load shedding half hour duration and also some of the peak load. This results in diesel generator usage being eliminated for power backup use case for which it was committed in method 1. This also results in overall cost savings as shown Table 2 below.

TABLE 2

235 KWh BESS supporting variable peak load and power backup

| Day | Fixed Load | Interruptible Load | Var Peak Load | Total Load Var Peak + Base | BESS max O/P Power | DG Max O/P Power | Cycle Count | Cycle Cost | Total Weighted Cost | Currency |
|---|---|---|---|---|---|---|---|---|---|---|
| 1 | 175 | 505 | 90 | 770 | 175 | 0 | 1 | 1470 | 132700.2654 | INR |
| 2 | 175 | 505 | 90 | 770 | 175 | 0 | 1 | 1470 | 132615.8829 | INR |
| 3 | 75 | 605 | 60 | 740 | 75 | 0 | 1 | 1470 | 132240.1979 | INR |
| 4 | 75 | 605 | 60 | 740 | 75 | 0 | 1 | 1470 | 132393.9067 | INR |
|   |   |   |   |   |   |   |   | 5880 | 529950.253 | INR |
| Percentage cost savings by using BESS for Back up power of critical loads | | | | | | | | | 0.645397432 | % |

This cost savings can be achieved without any additional investments in battery of any other generation assets. On the contrary, the diesel generator usage may be totally eliminated, which can potentially result in additional cap and maintenance cost savings.

Method 3:

Day 3 and Day 4 are different from Day 1 and 2 for an important reason: the fixed load can be reduced from 175 KW to 75 KW while the interruptible load can be increased from 505 KW to 605 KW. Since interruptible loads can be curtailed during a demand response event or utility power cut, this can allow loads under the BESS for backup power to be reduced and can enable further optimization. Such an optimization opportunity has not been considered in method 2.

TABLE 3

235 KWh BESS supporting variable peak load; DG supporting power backup, cycle count reduced by one

| Day | Fixed Load | Interruptible Load | Var Peak Load | Total Load Var Peak + Base | BESS max O/P Power | DG Max O/P Power | Cycle Count | Cycle Cost | Total Weighted Cost | Currency |
|---|---|---|---|---|---|---|---|---|---|---|
| 1 | 175 | 505 | 90 | 770 | 175 | 0 | 1 | 1470 | 132700.2654 | INR |
| 2 | 175 | 505 | 90 | 770 | 175 | 0 | 1 | 1470 | 132615.8829 | INR |
| 3 | 75 | 605 | 60 | 740 | 75 | 0 | 1 | 1470 | 132240.1979 | INR |
| 4 | 75 | 605 | 60 | 740 | 75 | 0 | 0 | 0 | 130036.7274 | INR |
| | | | | | | | | 4410 | 527593.0737 | INR |
| | Percentage cost savings by reducing BESS cycle count when compared to using DG for backup Power | | | | | | | | 1.087319312 | % |
| | Percentage cost savings on Day 4 by reducing BESS cycle count | | | | | | | | 1.780425839 | % |

Since the peak demand of the 4$^{th}$ day is 75 KW with a remnant energy in the battery on the start of the 4$^{th}$ day as 103.25 KWh, skip the charging on the fourth day and avail the remnant against the peak. An additional energy of (75−103.25+47) may be consumed additionally from the grid during the power cut event. Yet a charging cycle is avoided and Rs1470 is saved under this head. This can leave a net savings of Rs. 2357, which is 1.78% of that day's energy, bill as illustrated in Table 4 below.

TABLE 4

| Day | Fixed Load (KWh) | Available Battery Energy (KWh) just before power cut | Total Weighted Cost | Diff | % Diff |
|---|---|---|---|---|---|
| 1 | 175 | 223.25 | 132700.2654 | | |
| 2 | 175 | 223.25 | 132615.8829 | | |
| 3 | 75 | 223.25 | 132240.1979 | | |
| 4 | 75 | 223.25 | 132393.9067 | | |
| | | By Optimal Switching | | | |
| 4 | 75 | 103.25 | 130036.7274 | 2357.179 | 1.780429 |

From the foregoing, it can be appreciated that the cost weighted energy optimization can provide a fiscal gain, which energy maximization cannot provide. A supervisory control hosting such an optimizing algorithm can collect the operational parameters and the cost profiles. Computing the switching details based on these downloads such as commands to an EMS (Energy management System) to effect the switching, can result in economic gains. Note that an example of such an EMS is the EMS 140 shown in FIG. 2.

Some solutions may minimize the energy consumed by the users from the grid and may not use the cost factors to optimize. The disclosed approach, however, is different from these conventional solutions, which can render the disclosed solution compellingly attractive.

A supervisory controller such as the SCADA module 104 can be utilized to execute the cost weighted optimization to command out the EMS based on this approach (e.g., algorithm). Instead of Net Energy, cost (or price for utilities) of the energy as per the tariff rates can be computed and subjected to the optimization. More empathetically operational cost may be a part of the calculation. For example, a battery's life may be defined as the number of charging cycle. The monetary equivalent of one charging cycle can be reckoned in this calculation. Carbon credits earned from renewable power generation can also be considered as revenue, and carbon emissions from running fossil fuel based power generators such as diesel generators and the carbon footprint of a renewable generation plant can be considered as cost in this calculation as follows:

$$\mathbb{E}\{Cost_{wt}(\Delta t)\} = \mathbb{E}\{P_{grid} \times D_{Charge}\} + \mathbb{E}\{P_{grid} \times \Delta t\} \times$$
$$\mathbb{E}\{C_{Tariff\_ToU}\} + \mathbb{E}\{C_{Storage}\} + \mathbb{E}\{C_{cycle}\} +$$
$$\mathbb{E}\{C_{backup}\} - \mathbb{E}\{ARB_{Revenue}\} + \mathbb{E}\{CO2_{e\_cost}\} -$$
$$\mathbb{E}\{CO2_{ecredits}\}$$

$\mathbb{E}\{\ \}$: Expectation function; Denotes expected value of weighted cost of energy, and the dependent variables as defined below.

$P_{grid}$: Power drawn from grid $D_{charge}$: Demand Charge for power drawn during a peak $\Delta t$: Time interval during which the Energy cost calculation is done. Typically 15 minutes $C_{Tariff\_ToU}$: Time of Use Energy Tariff $C_{Storage}$: Cost of Energy Storage taking round trip efficiency and cost of charging the Battery $C_{cycle}$: Cost associated with a Battery Cycle (Battery cost/Cycle life of Battery)

$C_{backup}$: Cost of back up power $ARB_{Revenue}$: Revenue from Energy Arbitrage $Cost_{wt}(\Delta t)$ is the weighted cost taking into account the cost associated with Power Demand Charges, Time of Use Energy Tariffs, Cost of Battery Energy Storage, Cost of Battery Charge Cycles, Cost of Power backup or auxiliary generation to avoid grid demand charge and taking into account and arbitrage revenue. Optimization objective is to minimize $Cost_{wt}(\Delta t)$ and Power availability or $P_{grid} + P_{storage} + P_{Backup} - P_{load} \geq 0$ as constrained variable $CO2_{ecredits}$: Cumulated carbon credits earned by generating power from renewable power plants.

$CO2_{e\_cost}$: Emission cost associated with Green house gas emissions from the microgrid due to use of non-renewable power plants example Diesel Generators for power backup. Carbon cost also includes carbon cost of renewable generation assets such as Solar panels.

An optimization algorithm can be applied on forecasted energy generation (from all energy sources) and demand (from all loads) for at least 24 hours. The outcome of the optimization algorithm can be, for example, a schedule for battery charging, discharging and idling. The decision on when to charge or not to charge and when to discharge or not to discharge can be based on optimization calculations, which can be performed over the forecasted generation and demand for a period of at least 24 hours. If the forecast changes during the course of the day, optimization calculations can be performed on new short term and long-term forecast for generation and load and a new schedule can be derived from the calculations.

Figure 2:
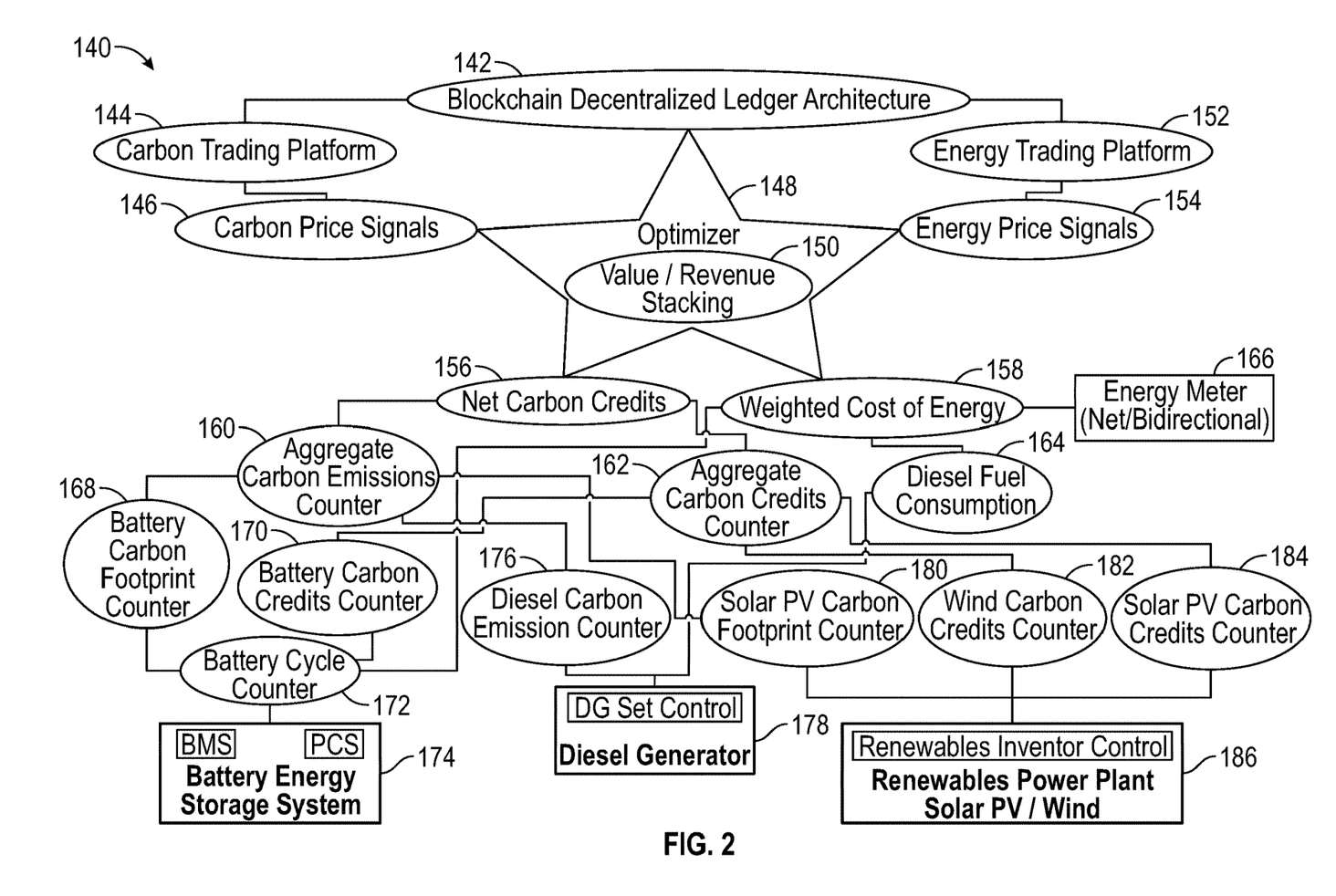
FIG. 2 illustrates the architecture of an energy management system, which can interface with energy and carbon trading platforms, in accordance with an embodiment

FIG. 2 illustrates EMS 140, which can interface with energy and carbon trading platforms, in accordance with an embodiment. Note that the various blocks and components shown in FIG. 2 can be implemented as modules and/or data. The EMS 140 depicted in FIG. 2 can include a blockchain decentralized ledger architecture 140 that can include or communicate with a carbon-trading platform 144 that can generate carbon price signals 146. The blockchain decentralized ledger architecture 140 can also communicate with an energy-trading platform 152 that can provide or generates energy price signals 154. Note that the term 'blockchain' as utilized herein can relate to a distributed ledger, analogous to a distributed database that can include a continuously growing list of records, called 'blocks', which can be linked and secured using cryptography, wherein each block may contain a hash pointer (i.e., a data structure providing a pointer to the place where some information is stored) as a link to a previous block, a timestamp, and data. A private blockchain (PB) can be used as a blockchain operated by an organization within a closed (non-public) communications network.

The carbon price signals 146 and the energy price signals 154 can be fed to an optimizer 148 that includes a value-revenue stacking module 150. The optimizer 148 can be configured to operate as an echo state network (ESN) dynamic non-linear optimizer. The optimizer 148 in turn can generate net carbon credits 156 and a weighted cost of energy 158. The net carbon credits 156 can be calculated from carbon counters including an aggregate carbon credits counter 162 and an aggregate carbon emissions counter 160. Note that the term 'carbon counter' as utilized herein can relate to a counter that can provide an indication of carbon generated or deferred by energy sources.

The weighted cost of energy 158 can be calculated from a battery cycle counter 172, a diesel fuel consumption module 164, and an energy meter 166 (net/bidirectional). The aggregate carbon emissions counter 160 can communicate with a battery carbon footprint counter 168, a diesel carbon emission counter 176, and a solar PV carbon footprint counter 180. The aggregate carbon credits counter 162 can communicate with a wind carbon credits counter 182 and a solar PV carbon credits counter 184. Furthermore, the aggregate carbon credits counter 162 can communicate with the battery carbon credits counter 170. The battery carbon footprint counter 168 and the battery carbon credits counter 170 can communicate with the battery cycle counter 172, which in turn can communicate with BESS 174. Note that examples of systems that may be utilized to implement BESS 174 include the BESS 119, the BESS 135, and the BESS 137 shown in FIG. 1.

The diesel carbon emission counter 176 can further communicate with a diesel generator 178, which in turn can communicate with the diesel fuel consumption module 164. That is, the diesel generator 178 can provide data to the diesel fuel consumption module 164. The solar PV carbon footprint counter 180, the wind carbon credits counter 182, and the solar PV carbon credits counter 184 can communicate with a renewable power plant 186 (e.g., solar PV, wind, etc.).

The EMS 140 can thus be based on a distributed and decentralized ledger architecture 142 that can interface with the carbon trading platform 144 and the energy-trading platform 152. The carbon-trading platform 144 can send 'real time' carbon price signals 145 to optimizer 148. The energy-trading platform 152 can also send energy price signals 154 to the optimizer 148. The prices can be expected to be dynamic when there are rapid changes in demand and supply due to the variable nature of distributed generation and loads that include a battery energy system such as, for example, the BESS 174.

The EMS 140 can maintain carbon footprint counters for battery and solar panels, since these assets have a one time carbon cost associated with the manufacturing process of these assets. Carbon footprints of battery may have a fixed component that can be associated with life of the battery in years and a variable component associated with cycle life of the batteries. The cycle life of a battery can be reduced faster if the battery is cycled more frequently. Hence, when the battery is exercised more frequently, the carbon cost associated with battery cycles also goes up. This is a way to account for frequent cycles that can degrade batteries faster, which in turn may call for replacing or recycling batteries that can increase the manufacturing of the batteries and the carbon footprint associated with the production. Similarly, there is a carbon cost associated with manufacturing of solar cells that may be accounted in the usage of solar panels.

The diesel carbon emission counter 176 for the diesel generator 178 can also be maintained to count the emissions due to the operation of diesel generators. Carbon emissions from diesel generators can be, for example, approximately 2.68 Kg per liter of diesel fuel consumed. A carbon footprint associated with power purchased from the main grid can also be accounted for. If the grid power is generated by coal fired thermal power plants, emission costs associated with grid power can be taken as, for example, 1 Ton $CO_{2e}$ per MWh of energy drawn from the grid.

The EMS 140 can also maintain carbon credits counters for renewable generation assets and the BESS 174 that stores renewable energy and dispatches stored energy when there is no renewable generation. Net carbon credits can be calculated based on carbon credits earned after discounting for carbon emissions at the site (e.g., sites such as the first microgrid site 116, the second microgrid site 118, and the third microgrid site 120 shown in FIG. 1).

Net carbon credits can be traded with a carbon exchange and may have an associated currency value. The currency value can vary from market to market and can also be based on time. The carbon prices are expected to go up as 'low hanging' carbon emission savings projects are completed and new initiatives require more investments than older investments.

Figure 3:
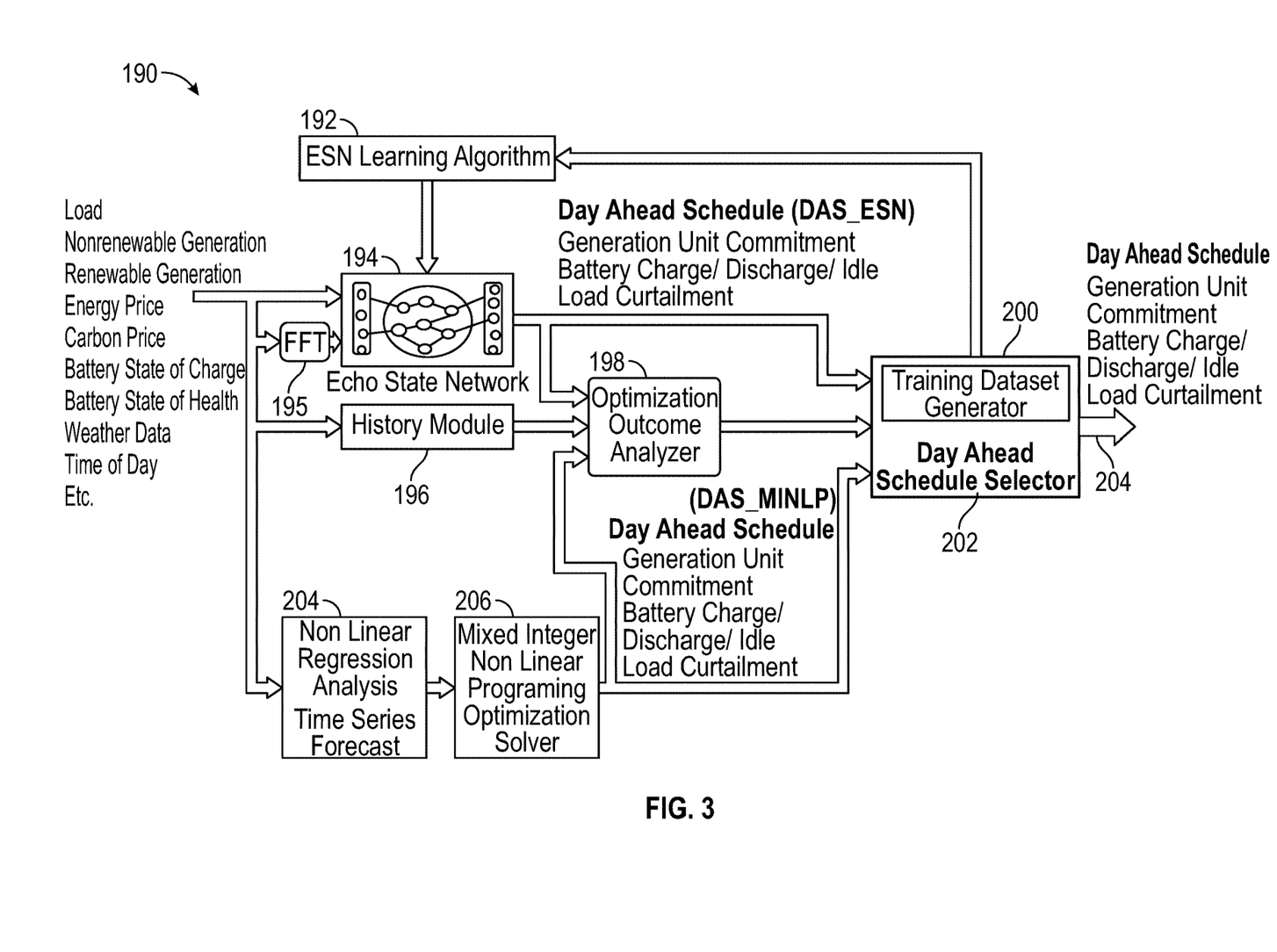
FIG. 3 illustrates a block diagram of a dynamic non-linear optimization solver, which can be implemented in accordance with an embodiment.

FIG. 3 illustrates a block diagram of a dynamic non-linear optimization solver 190, which can be implemented in accordance with an embodiment. The dynamic non-linear optimization solver 190 can include a plurality of modules, including, for example, a module 192 that implements an echo state network (ESN) learning algorithm. The module 192 receives data generated from a day-ahead schedule selector module 200 that can include a training dataset generator 202. The module 192 can provide data to an echo state network 194, which in can turn receive data from an FFT (Fast Fourier Transform) module 195. The echo state network 194 can be implemented as a type of reservoir computer that uses a recurrent neural network with a sparsely and operably connected hidden layer (e.g., with typically 1% connectivity). The connectivity and weights of hidden neurons can be fixed and randomly assigned. Furthermore, the echo state network 194 may implement an ESN dynamic non-linear optimizer model as a part of the overall dynamic non-linear optimization solver 190.

The dynamic non-linear optimization solver 190 can further include a history module 196 that provides data to an optimization outcome analyzer 198, which in turn can provide data to the day-ahead schedule selector module 200. Furthermore, the dynamic non-linear optimization solver 190 can include a module 204 that can perform a non-linear regression analysis and time series forecast. Data from module 204 can be provided to a module 206 that can function as a mixed integer non-linear programming optimization solver. Data from the module 206 can be provided to the optimization outcome analyzer 198 and also to the day-ahead schedule selector module 200, which in turn can generate data as indicated by arrow 205 indicative of, for example, a day-ahead schedule (i.e., for generation unit commitment, battery charge, discharge, idle, load curtailment).

The dynamic, intermittent and unpredictable nature of electricity generation from renewable sources, dynamic loads, dynamic pricing of energy and carbon can require an optimizer such as the dynamic non-linear optimization solver 190 to find a global minimum for weighted cost taking into account the expected future generation, loads and prices. Combinatorial optimization that does not consider the future generation, demand and prices cannot calculate a true global minimum for the weighted cost. Conventional solutions may include the forecasting functions for power generation, load and prices, and then use methods such as Mixed Integer Linear Programming or Dynamic Programming to compute a day ahead schedule that minimizes the weighted cost of energy and carbon, while meeting a set of defined constraints. Availability of energy is one such constraint. Some conventional solutions have attempted to improve the optimization taking into account the non-linear nature of the Energy system by applying Mixed Integer Non Linear Programming techniques.

The embodiments, on the other hand, relate to systems and methods in which the forecasting function and cost minimization objective functions can be combined and the non-linear programming problem can be solved by the echo state network 194, which is a class of recurrent neural networks that has properties of faster training of the neural network. Recurrent neural networks are neural networks with memory and have properties that make them useful for time series prediction with functions that have non-linearities or discontinuities. A generalized recurrent neural network (RNN) is difficult to train, but echo state networks which are a class of RNNs in which only the outer layer of neurons are retrained while the inner reservoir layer can be initialized only once and remain fixed when the network is retrained.

A non-linear programming problem can be first transformed into a primal-dual problem. The echo state network 194 can be constructed based on the primal-dual problem whose stable state is a feasible solution to the primal-dual problem such that a solution to the primal-dual problem is also a solution to the original non-linear programming problem.

Input to the echo state network 194 may comprise not only the time series data for the inputs, but may also include signals obtained after transforming the signals to frequency domain after applying the FFT through the FFT module 195. That is, the FFT module 195 at the inputs of echo state network 194 can overcome two fundamental problems that exist in neural networks. Neural Networks tend to ignore significant inputs if the training data sets do not possess sufficient variance in the training data sets.

Variance in time domain or the lack of it can affect both the training of a neural network and also its effectiveness to perform inferences after the neural network is trained with a data set that do not have sufficient variance. Transforming the time domain inputs to frequency domain and processing inputs in the frequency domain could be an effective solution to this fundamental problem. A time domain signal with no variance will have a peak at zero frequency in the frequency domain and zero values at all other frequencies. Similarly sinusoids at different frequencies will have peaks at their respective frequencies, which can allow neural networks to differentiate between with similar amplitudes in the time domain but have different frequencies.

Neural networks tend to have high convergence time when the inputs have wideband noise. The presence wideband noise can cause neural networks to train forever and not converge if the noise amplitude is high relative to sensor or input signals (e.g., a low signal to noise ratio). Applying the FFT of the FFT module 195 to transform the time domain input signal to frequency domain has a filtering effect for wideband noise. Unlike conventional filters, the FFT of the FFT module 195 may not remove relevant signals at any frequency. Rather it works based on a basic property of Fourier transform that the frequency spectrum of a wideband noise signal in time domain is a flat signal in frequency domain, which would tend to be ignored by a neural network as neural network training algorithms like error back propagation do not train on input signals that have no variance. Thus, a hybrid non-linear optimization solver such as the dynamic non-linear optimization solver 190, which can leverage machine learning techniques and which works well for time series forecast dependent optimization functions along with mixed integer non linear optimization techniques has not been previously designed and implemented.

Figure 4:
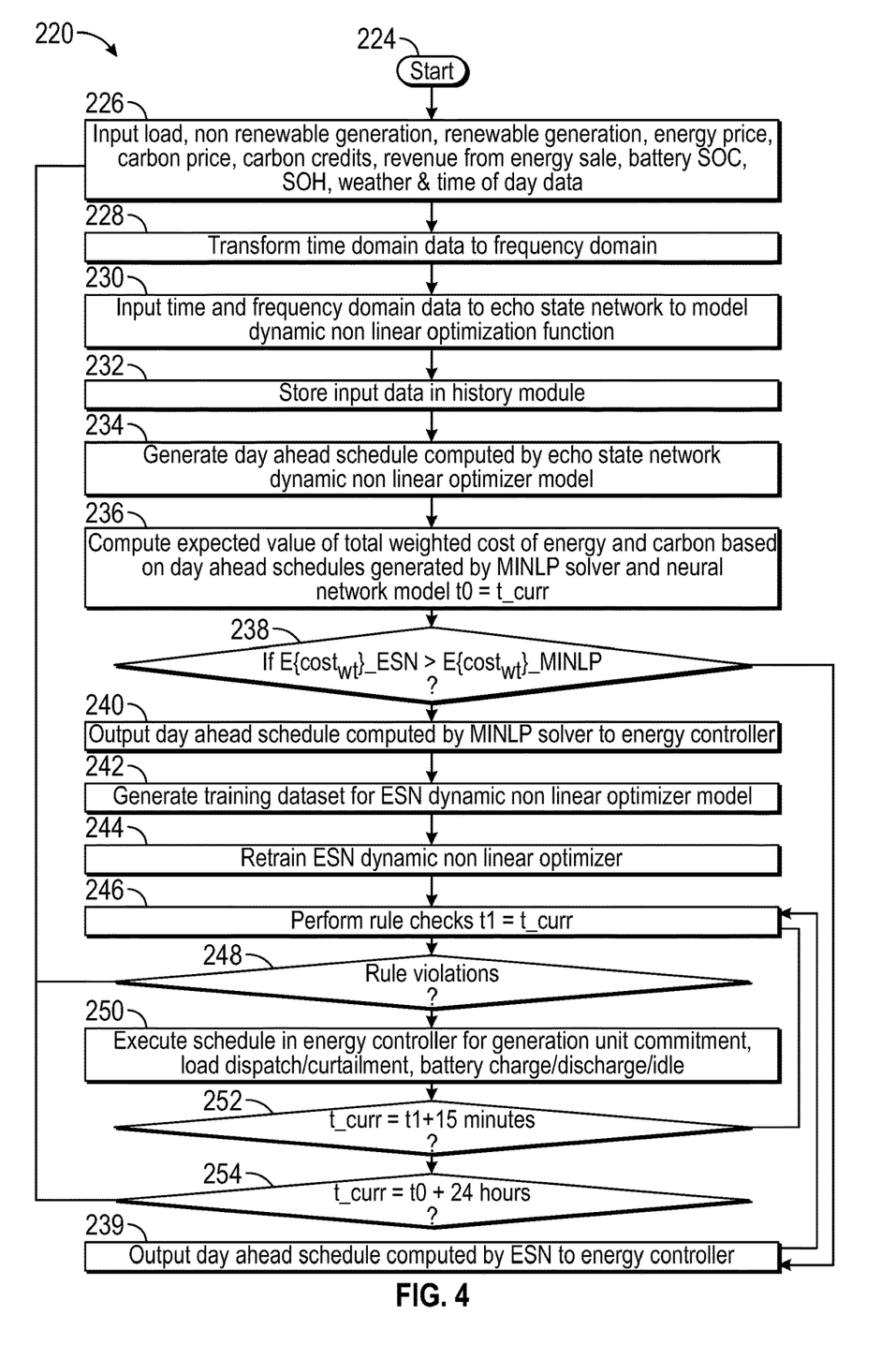
FIG. 4 illustrates a flow chart depicting logical operational steps of a method for hybrid non-linear optimization solving, in accordance with an embodiment.

FIG. 4 illustrates a flow chart depicting logical operational steps of a method 220 for hybrid non-linear optimization solving, in accordance with an embodiment. The method 220 can be followed to implement the dynamic non-linear optimization solver 190 depicted in FIG. 3. As shown at block 224, the process of method 220 can be initiated. As indicated next at block 226, a step or operation can be implemented to input data including but not limited to data indicative of load, non-renewable generation, renewable generation, energy price, carbon price, carbon credits, revenue from energy sale, battery data, stage of charge (SOC), state of health (SOH), weather, and time of day data.

Note that as utilized herein, the term stage of charge (SOC) can relate to a battery SOC which can be used as a metric to quantify the amount of energy left in a battery compared with the energy it had when it was full and it gives the user an indication of how much longer a battery will continue to perform before it needs recharging. The term state of health (SOH), on the other hand, can relate to a battery SOH, which can represent the level of degradation of the battery due to the aging phenomena.

As depicted next at block 228, a step or operation can be implemented to transform time domain data to the frequency domain. Thereafter, as shown at block 230, a step or operation can be implemented to input time and frequency domain data to the echo state network 194 shown in FIG. 3 to model a dynamic non-linear optimization function. Then, as depicted at block 232, a step or operation can be implemented to store Input/Output data in the history module 196 illustrated in FIG. 3.

Following processing of the step/operation shown at block 232, a step or operation can be implemented as depicted at block 234 to generate a day-ahead schedule computed by the echo state network 194 (i.e., a dynamic non-linear optimizer model). Next, as depicted at block 236, a step or operation can be implemented to compute the expected value of the total weighted cost of energy and carbon based on the day-ahead schedule(s) generated by the echo state network 194 and the dynamic non-linear optimization solver 190 based on t0=t_curr. The dynamic non-linear optimization solver 190 can function at least in part as a mixed-integer non-linear programming (MINLP) solver.

Note that an MINLP solver alone does not make a dynamic non-linear optimization solver. That is, the MINLP solver can function based on a time series forecast generated by non-linear regression analysis, which can be prone to uncertainties or errors in forecasting. It is the combination of the echo state network 194, the module 204 and the module 206 along with the module 192, the FFT module 195, the history module 196, the optimization outcome analyzer 198 and the day-ahead schedule selector module 200 that can make a dynamic optimization solver. The optimization outcome analyzer 198 lets the training dataset generator 202 retrain the echo state network 194 if the day-ahead schedule generated by the echo state network 194 is less optimal than 206.

A decision operation can be then implemented as shown at block 238 as follows: $\mathbb{E}\{Cost_{wt}\}\_ESN > \mathbb{E}\{Cost_{wt}\}\_MINLP$. A step or operation to output a day-ahead schedule computed by ESN to the energy controller can be implemented, as shown at block 239. Alternatively, a step or operation to output the day-ahead schedule computed by the MINLP solver to the energy controller can be implemented as shown at block 240. Following processing of the operation depicted at block 240, a step or operation can be implemented to generate a training dataset for the echo state network 194 (e.g., an ESN dynamic non-linear optimizer model) as shown at block 242. Then, as shown at block 244, a step or operation can be implemented to retrain the ESN dynamic non-linear optimizer (e.g., the optimizer 148 shown in FIG. 2).

Next, as depicted at block 246, a step or operation can be implemented to perform rule checks (t1=t_curr). This operation may also include the use of data generated as a result of the step/operation shown at block 239. Following processing of the operation shown at block 246, a step or operation can be implemented as depicted at block 248 to check for rule violations. Depending on the result of the operation performed as shown at block 248, the step or operations beginning with the step/operations depicted at block 226 and so on may be repeated. If not, then the operation shown at block 250 can be implemented in which the day-ahead schedule can be executed in the energy controller for generation unit commitment, load dispatch/curtailment, battery charge/discharge/idle. Next, as shown at decision block 252, a step or operation can be implemented as: t_curr=t1+15 minutes. Thereafter, as shown at decision block 254, a step or operation can be implemented as: t_curr=t0+24 hours.

Based on the foregoing, it can be appreciated that when a BESS is used to support multiple use cases, the parameters based on the optimization can be dynamic, non-linear and have discontinuities. Cost weighted optimization can be applied since each use case has a cost and a certain revenue potential associated with it. The cost can include cost of energy and the cost of carbon that has a monetary value associated with emissions. The revenue can includes carbon credits associated with it.

This approach is different from conventional solutions, which treat energy cost minimization and carbon emissions as two separate objectives, which are sometimes in conflict with each other, and can result in sub-optimal results for either energy cost or carbon emissions or both. An optimization objective can be to minimize the total weighted cost of energy and carbon after taking into account the revenue from energy sale and carbon credits, which may have a currency value associated with it.

This disclosed approach can involve an EMS that can interface with an external Energy trading platform and a carbon trading platform, and can receive pricing signals for Energy and Carbon that may be dynamic and time dependent as shown in FIG. 2. This EMS can maintain counters for carbon emissions and carbon credits earned. The optimization problem can be treated as a dynamic non-linear optimization problem and a differentiated method to model the dynamic and non-linear nature of the system can be implemented, as shown in FIG. 4. A hybrid model can use a recurrent neural network, a method that can enable faster training of a class of recurrent neural networks, known as echo state networks to model a combined forecasting and optimization solver, along with a first principles based Mixed Integer Non Linear Programming solver and a non-linear regression analysis based time series forecasting.

The disclosed system and methods can overcome known limitations in conventional systems that use a mixed integer non-linear solver that has performance issues due to uncertainties or errors in forecasting functions. The disclosed system and methods can also overcome limitations with dynamic non linear solvers based on echo state networks, a class of recurrent neural network by enabling it to be dynamically retrained if its performance is sub-optimal as compared to a conventional mixed integer non linear solver.

One having ordinary skill in the relevant art will readily recognize that the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

The embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of enabling synchronizing of controllers in an automation control system, as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 5:
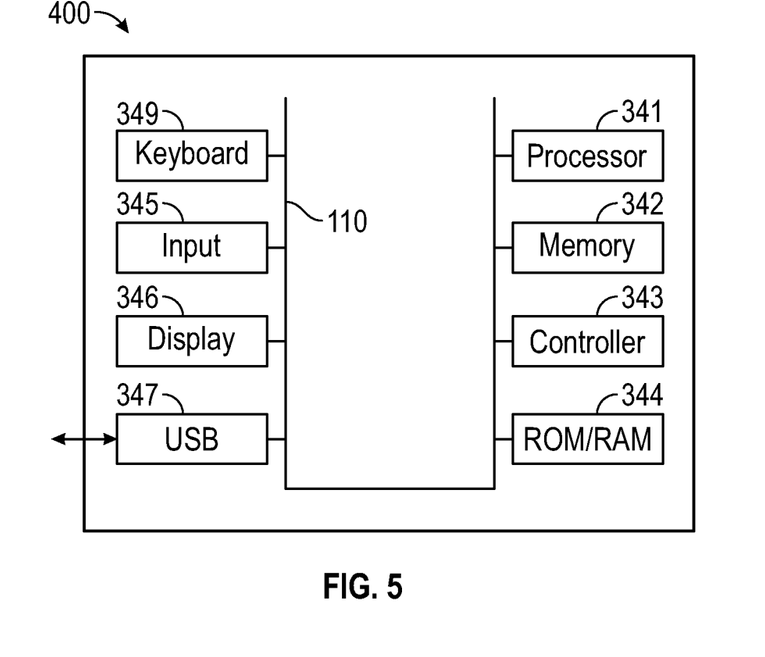
FIG. 5 illustrates a schematic view of a computer system, in accordance with an embodiment.
Figure 6:
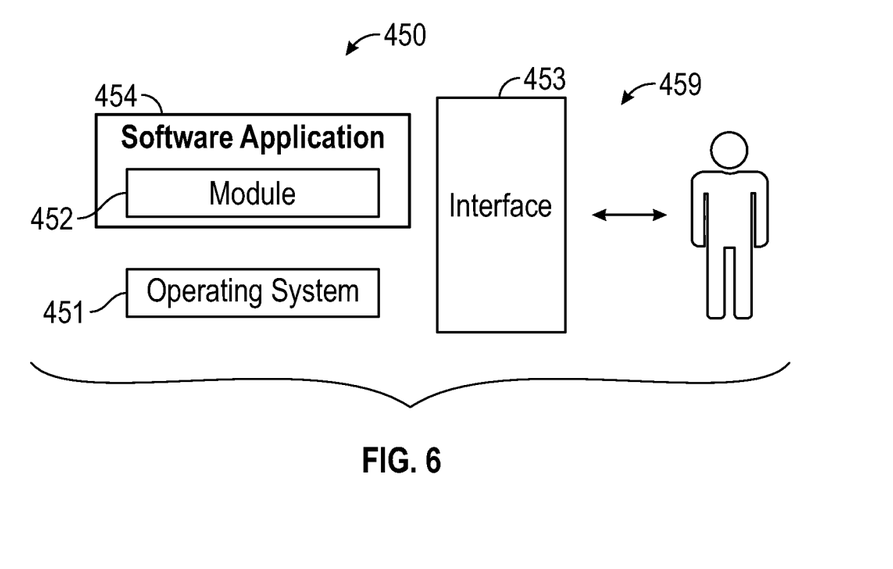
FIG. 6 illustrates a schematic view of a software system including a module, an operating system, and a user interface, in accordance with an embodiment.

FIG. 5 and FIG. 6 are shown only as exemplary diagrams of data-processing environments in which example embodiments may be implemented. It should be appreciated that FIG. 5 and FIG. 6 are only exemplary and are not intended to assert or imply any limitation with regard to the environments in which aspects or embodiments of the embodiments may be implemented. Many modifications to the depicted environments described and illustrated herein may be made without departing from the spirit and scope of the embodiments.

As illustrated in FIG. 5, some embodiments and/or aspects of the embodiments may be implemented in the context of a data-processing apparatus 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 349 and/or another input device 345 (e.g., a pointing device, such as a mouse, track ball, pen device, etc.), a display 346 (e.g., a monitor, touch screen display, etc) and/or other peripheral connections and components. The database 114 illustrated and discussed previously herein may in some embodiments be located with, for example, the memory 342 or another memory.

The system bus 110 serves as the main electronic information highway interconnecting the other illustrated components of the hardware of the data-processing apparatus 400. In some embodiments, the processor 341 may be a CPU that functions as the central processing unit of the data-processing apparatus 400, performing calculations and logic operations required to execute a program. Read only memory (ROM) and random access memory (RAM) of the ROM/RAM 344 are examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM/RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of the data-processing apparatus 400 can communicate electronically through a system bus 351 or similar architecture. The system bus 351 may be, for example, a subsystem that transfers data between, for example, computer components within the data-processing apparatus 400 or to and from other data-processing devices, components, computers, etc. The data-processing apparatus 400 may be implemented in some embodiments as, for example, a server in a client-server based network (e.g., the Internet) or in the context of a client and a server (i.e., where aspects are practiced on the client and the server).

In some embodiments, the data-processing apparatus 400 may be, for example, a standalone desktop computer, a laptop computer, a Smartphone, a pad computing device and so on, wherein each such device can be operably connected to and/or in communication with a client-server based network or other types of networks (e.g., cellular networks, Wi-Fi, etc). Examples of such networks can also include the wide area communications network 112 illustrated in FIG. 1. Other examples of the data-processing apparatus 400 may include, for example, the thin client desktop computer 94 and the server grade computer 90 shown in FIG. 1. An example of the display 346 is the widescreen display(s) 92 also depicted in FIG. 1.

FIG. 6 illustrates a computer software system 450 for directing the operation of the data-processing apparatus 400 depicted in FIG. 5. The software application 454, may be stored for example in memory 342 and/or another memory and can include one or more modules such as the module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing apparatus 400. The data-processing apparatus 400 can receive user commands and data through the interface 453. These inputs may be then acted upon by the data-processing apparatus 400 in accordance with instructions (e.g., steps or operations) from the operating system 451 and/or the software application 454. The interface 453 in some embodiments can serve to display results, whereupon a user 459 may supply additional inputs or terminate a session. The software application 454 can include module(s) 452, which can, for example, implement the steps, instructions, operations and scripts such as those discussed and illustrated herein with respect to the various illustrated figures, blocks and components.

The following discussion is intended to provide a brief, general description of suitable computing environments in which the system and method may be implemented. Although not required, the embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can further refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a device such as the BESS described herein.

The embodiments can also constitute an improvement to a technological system (e.g., such as the disclosed BESS) rather than simply the use of the computer system as a tool. The disclosed modules, instructions, steps and functionalities discussed herein can result in a specific improvement over prior systems, resulting in improved data-processing systems.

FIG. 5 and FIG. 6 are intended as examples and not as architectural limitations of the embodiments. Additionally, such embodiments are not limited to any particular application or computing or data processing environment. Instead, those skilled in the art will appreciate that the disclosed approach may be advantageously applied to a variety of systems and application software. Moreover, the embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps, operations and/or instructions discussed and illustrated herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology including improvements to automation control systems used in, for example, industrial facilities. The embodiments can offer technical improvements to a computer-technology such as an automation control system that includes a data-processing system, and further can provide for a non-abstract improvement to a computer technology via a technical solution to the technical problem(s) identified in the background section of this disclosure.

The embodiments require less time for processing and also fewer resources in terms of memory and processing power in the underlying systems including the use of computer technology for implementing the dynamic non-linear optimization of a BESS. Such improvements can result from various implementations of the embodiments. The claimed solutions may be rooted in computer technology in order to overcome a problem specifically arising in the realm of computers and computer networks including battery energy storage systems.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for optimizing a battery energy storage system, comprising:
inputting data to an echo state network of a reservoir computer having a sparsely and operably connected hidden layer with connectivity and weights of hidden neurons that are fixed and randomly assigned, the data relating to an operation of a battery energy storage system and including at least: load data, state of charge (SOC), state of health (SOH), renewable energy data, non-renewable energy data, carbon emissions, carbon credits and a weighted cost of energy; and optimizing the operation of the battery energy storage system based on the data input to and processed by the echo state network and which relates to the operation of the battery energy storage system.

2. The method of claim 1 wherein the echo state network comprises a neural network.

3. The method of claim 1 further comprising controlling the battery energy storage system after optimizing the operation of the battery energy storage system based on the data input to and processed by the echo state network.

4. The method of claim 1 wherein optimizing the operation of the battery energy storage system based on the data input to and processed by the echo state network, further comprises:

generating a day-ahead schedule for the operation of the battery energy storage system based on data output from an optimization outcome analyzer and the data output from the echo state network.

5. The method of claim 1 wherein prior to inputting the data to the echo state network, at least a portion of the data is subject to a fast fourier transform.

6. The method of claim 1 wherein an output of a fast fourier transform is input to the echo state network.

7. The method of claim 1 wherein prior to inputting the data to the echo state network, at least a portion of the data is subject to a fast fourier transform, and an output of the fast fourier transform is input to the echo state network.

8. The method of claim 1 wherein optimizing the operation of the battery energy storage system based on the data input to and processed by the echo state network further involves dynamic non-linear optimization of the operation of the battery energy storage system.

9. A system, comprising: an echo state network of a reservoir computer having a sparsely and operably connected hidden layer with connectivity and weights of hidden neurons that are fixed and randomly assigned, wherein data is input to the echo state network, the data relating to an operation of a battery energy storage system and including at least: load data, state of charge (SOC), state of health (SOH), renewable energy data, non-renewable energy data, carbon emissions, carbon credits, a weighted cost of energy, revenue from energy sale, battery data, state of charge data, state of health data, weather data, and time of day data; and a battery energy storage system, wherein the operation of the battery energy storage system is optimized based on the data input to and processed by the echo state network and which relates to the operation of the battery energy storage system.

10. The system of claim 9 wherein the echo state network comprises a neural network.

11. The system of claim 9 further comprising a controller for controlling the battery energy storage system after optimizing the operation of the battery energy storage system based on the data input to and processed by the echo state network.

12. The system of claim 9 further comprising a day-ahead schedule generated for the operation of the battery energy storage system based on data output from an optimization outcome analyzer and the data output from the echo state network.

13. The system of claim 9 wherein prior to inputting the data to the echo state network, at least a portion of the data is subject to a fast fourier transform and an output of the fast fourier transform is input to the echo state network.

14. The system of claim 9 wherein optimizing the operation of the battery energy storage system based on the data input to and processed by the echo state network further involves dynamic non-linear optimization of the operation of the battery energy storage system.

15. A battery energy storage system, comprising:

at least one processor and a memory, the memory storing instructions to cause the at least one processor to perform:

inputting data to an echo state network of a reservoir computer having a sparsely and operably connected hidden layer with connectivity and weights of hidden neurons that are fixed and randomly assigned, the data relating to an operation of a battery energy storage system and including at least: load data, state of charge (SOC), state of health (SOH), renewable energy data, non-renewable energy data, carbon emissions, carbon credits and a weighted cost of energy; and optimizing the operation of the battery energy storage system based on the data input to and processed by the echo state network and which relates to the operation of the battery energy storage system.

16. The battery energy storage system of claim 15 wherein the instructions further cause the at least one processor to perform controlling the battery energy storage system after optimizing the operation of the battery energy storage system based on the data input to and processed by the echo state network.

17. The battery energy storage system of claim 15 wherein the instructions for performing optimizing the operation of the battery energy storage system based on the data input to and processed by the echo state network, further comprise instructions for performing generating a day-ahead schedule for the operation of the battery energy storage system based on data output from an optimization outcome analyzer and the data output from the echo state network.

18. The battery energy storage system of claim 17 wherein prior to inputting the data to the echo state network, at least a portion of the input data is subject to a fast fourier transform.

19. The battery energy storage system of claim 15 wherein the instructions for performing optimizing the operation of the battery energy storage system based on the data input to and processed by the echo state network, further comprise instructions for performing dynamic non-linear optimization of the operation of the battery energy storage system.

20. The battery energy storage system of claim 15 wherein:

the SOC is related to an amount of energy left in the at least one battery of the battery energy storage system as compared when the at least one battery was full; and the SOH is related to a level of degradation of the at least one battery due to aging of the at least one battery.

* * * * *